3,280,126
SULFONATED PHENOXY AND PHENYLTHIO DYE DERIVATIVES

Hans Altermatt, Reinach, Basel-Land, Switzerland, assignor to Ciba Limited, Basel, Switzerland, a Swiss company
No Drawing. Filed Jan. 14, 1964, Ser. No. 337,532
Claims priority, application Switzerland, Oct. 28, 1960, 12,112/60; Apr. 24, 1961, 4,788/61; May 4, 1961, 5,240/61; Aug. 21, 1961, 9,707/61; Sept. 29, 1961, 11,332/61; June 28, 1962, 7,793/62
2 Claims. (Cl. 260—264)

This application is a continuation-in-part of my application Serial No. 147,139, filed October 24, 1961, now abandoned and of my copending application Serial No. 216,749, filed August 14, 1962 (now abandoned).

The present invention provides new, valuable vat dyestuffs which contain one, preferably acidic, water-solubilizing group and a vattable system comprising at least 4 fused rings and one, if desired substituted, hydrocarbon radical that is bound by a sulfur or by an oxygen atom, such radical being a naphthoxy or above all a phenoxy, a naphthylmercapto or a phenylmercapto group.

As vattable chromophore having at least 4 rings fused together most valuable are those having 8 to 9 carbocyclic fused rings, while the phenoxy and phenyl mercapto group may contain simple substituents, such as a lower alkyl or alkoxy group or a halogen atom, especially a chlorine or bromine atom. Consequently the dyestuffs of the invention may be derived from the following dyestuffs: Dibenzanthrone, isodibenzanthrone, anthanthrone, dibenzpyrenequinone, pyranthrone, flavanthrone, indanthrone, acedianthrone, N:N'-diethyldipyrazolanthronyl, anthraquinone-2:1(N)-1',2'-(N)-naphthacridone, 1:1'-dianthrimide-carbazole, 2':2''-diphenyl-anthraquinone-1:2-(N)-5:7(N)-dithiazole anthraquinone benzacridone and pyrenequinone.

By water-solubilizing groups are meant stable groups present in permanently soluble dyestuffs, such as the sulfonic acid and the carboxylic acid groups which are preferably bound to the aryloxy or arylmercapto group of the dyestuff molecule.

The dyestuffs of the invention are prepared by introducing an arylmercapto group into a vat dyestuff and, if desired, at the same time introducing a water-solubilizing group should such a group not already be present in the vat dyestuff used as starting material, or by introducing at least one acidic water-solubilizing group, for example a sulfate- or sulfonic acid radical, into a vat dyestuff having a vattable system comprising at least 4 condensed rings and an aryloxy or arylmercapto group.

This process can be carried out, for example, by condensation and the simultaneous, prior or subsequent introduction of one or several water-solubilizing groups such, for example, as the sulfate-, carboxylic acid- and/or sulfonic acid groups. Thus, for example, in the case of a vat dyestuff containing an exchangeable substituent, such as a nitro group or above all a chlorine or bromine atom, capable of being exchanged for an aryloxy or for an arylmercapto group that substituent is replaced, for example by condensation with a sulfonaphthol, a sulfo- or carboxyphenol or above all with a sulfonaphthylmercaptan or with sulfo- or carboxy-thiophenols.

Those of the vat dyestuffs of the invention which contain sulfonic acid groups may also be made by direct sulfonation which is an especially suitable method, because of its general applicability, for introducing acidic water-solubilizing groups. Thus a vat dyestuff which contains an aryloxy or an arylmercapto group, especially a naphthyloxy, naphthylmercapto, phenyloxy or phenylmercapto group which may contain simple substituents such as a methyl, ethyl, methoxy phenyl, phenoxy, benzyl, chlorine or bromine substituent, and also contains a vattable system comprising at least 4, but preferably at least 5 rings and advantageously containing not more than 9 consecutively condensed carbocyclic rings, may be used as starting material. A water-solubilizing substituent is introduced into a vat dyestuff of this type, for example by sulfonation; the sulfonation is very easily achieved, that is to say it can be carried out under very mild conditions. As such sulfonatable vat dyestuffs, there may above all be mentioned the aryloxy and arylmercapto derivatives of the acylamino-anthraquinone-, acedianthrone-, anthanthrone-, dibenzanthrone-, isodibenzanthrone-, flavanthrone-, pyranthrone-, benzanthrone-acridine- and anthrimide- or anthrimide-carbazole series.

The vat dyestuffs of the invention, containing a stable water-solubilizing group are suitable for dyeing a very wide variety of materials, such as synthetic or natural fibers, for example, cellulose ethers and esters, polyester fibers (Terylene or Dacron), polyamide fibers (nylon, etc.), polyacrylonitrile fibers (Orlon), and polyurethane fibers, and also wool and silk, but more especially they are suitable for dyeing or printing textile materials of natural or regenerated cellulose, dyeing being carried out by the so-called direct or exhaustion method or by padding.

The compounds of the invention that contain a substituent that reacts with the fiber can be fixed on wool or cellulose to give a fast dyeing, and the sulfoaryl mercapto and sulfoaryloxy derivatives with a low molecular weight yield valuable dyeings and prints expecially on wool, silk and polyamides.

Notwithstanding their solubility in water, the vat dyestuffs of the invention yield on cellulosic fibers when applied by the vat dyeing method, that is to say, in the presence of an alkali and a reducing agent, dyeings and prints that are distinguished by their very good fastness to light, chlorine and wet treatments, especially by their excellent fastness to soda boiling and, as a rule, by their good levelness and good dyestuff penetration.

The dyeings and prints so obtained are also fast to dry cleaning and migration. The dyed fabrics can therefore be coated with synthetic resins, for example, polyvinyl chloride, without the dyestuff migrating into the resin, which is particularly important in the manufacture of artificial leather. Furthermore, there may also be mentioned the ease with which the compounds of the invention can be vatted, which makes for economy and simplicity of application.

As compared with the conventional vat dyestuffs, the vat dyestuffs of the invention have a better levelling and penetrating power. When used for dyeings in circulating liquor machines they do not give rise to faulty dyeings caused by the precipitation of reoxidized dyestuff even when foam is formed, and the pigmenting operation that is necessary in dyeing wound packages, for example, cheeses, or in dyeing tricots on a winch machine, with the conventional vat dyestuff, is omitted in the case of the dyestuffs of the invention. They can also be used in the form of solutions in the fast-running pad-dyeing process and, in this case they do not have to be in a finely dispersed commercial form or in the form of special pastes, so that the disadvantages of such forms (instability of the paste, dusting, and need for several operations to prepare finely divided powder) are eliminated. Finally, they can generally be vatted very easily, often at room temperature and, if required, with mild reducing agents. They possess a very good solubility in the vat, and yield strong and very level dyeings especially on regenerated cellulose that exhibit the same tint as the corresponding dyeings on cotton.

Unless otherwise stated, the parts and percentages in the following examples are by weight, and the relationship of parts by weight to parts by volume is the same as that of the gram to the millilitre.

EXAMPLE 1

10 parts of 4-phenoxyanthraquinone-2:1(N)-benzacridone, prepared from 4-chloroanthraquinone-2:1(N)-benz-acridone and potassium phenolate in phenol, are sprinkled into 70 parts by volume of oleum of 5% strength while stirring well. As soon as a neutralized test portion is soluble in water, the whole is poured into ice water, filtered, and the residue is made slightly alkaline with a dilute solution of sodium hydroxide. The dyestuff so obtained dyes cotton violet tints when applied according to Dyeing Prescription A.

EXAMPLE 2

Into a melt consisting of 60 parts of phenol and 25 parts of potassium hydroxide there are introduced at 110° C, 5 parts of mono-nitroacedianthrone, and the whole is stirred for 2 hours at 150 to 150° C. While still hot, the melt is poured into 1000 parts of water and the residue is filtered off. The residue is then well washed with hot water and then with methanol. The dry dyestuff is stirred, at room temperature, in 10 times its weight of oleum that contains 5% of $SO_3$. As soon as a neutralized test portion is soluble in water, the reaction mixture is poured on to ice and the sulfonic acid is washed with a dilute solution of sodium chloride until the washings run neutral. The residue is then stirred in a little more than the calculated amount of 1 N-sodium hydroxide solution. The dyestuff of the formula

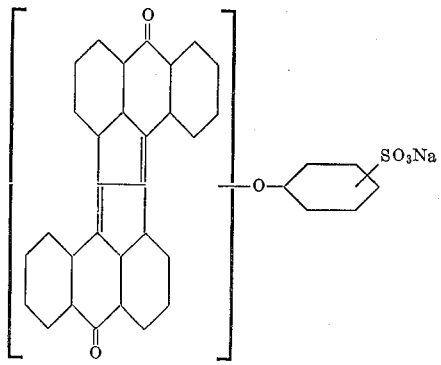

can be obtained by salting out. It dyes cotton brown tints when applied according to Dyeing Prescription A.

EXAMPLE 3

If, in Example 2, the 5 parts of mononitroacedianthrone are replaced by 5 parts of dibromo-anthanthrone (CI No. 59,300), there is obtained a dyestuff of the following formula

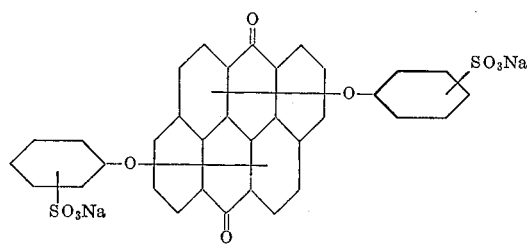

It dyes cotton bordeaux tints when applied according to Dyeing Prescription A.

EXAMPLE 4

5.15 parts of 3:3'-dichloro-indanthrone are stirred for 15 hours under reflux, in 200 parts by volume of amyl alcohol with 4 parts by volume of thiophenol and 5.7 parts of potassium carbonate. After cooling, the greenish-blue dyestuff of the formula

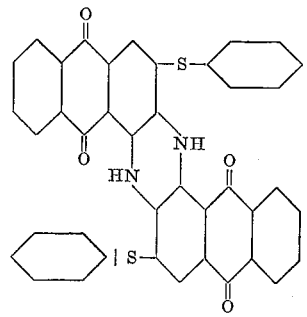

can be filtered off.

10 parts of the above dry dyestuff are stirred into 75 parts by volume of oleum containing 5% of free $SO_3$, at room temperature. As soon as a neutralized sample in soluble in water, the whole is poured into ice, filtered and the precipitate is washed with a small amount of water. The residue is dissolved in a dilute of sodium hydroxide, and then salted out with sodium chloride. The water-soluble blue dyestuff dyes cotton by the dyeing Process A, blue tints of good properties of fastness.

EXAMPLE 5

46.4 parts of dibromoanthanthrone (CI No. 59300) are stirred for 15 hours, under reflux, in 1000 parts by volume of amyl alcohol, with 40 parts by volume of thiophenol and 25 parts of potassium hydroxide. After cooling, the reddish-violet dyestuff of the formula

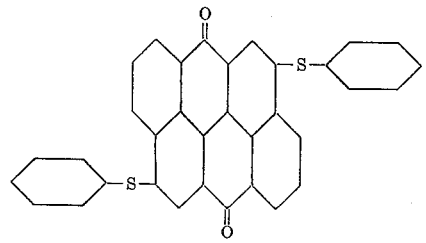

is filtered, and thoroughly washed first with methanol and then with water.

10 parts of the dried dyestuff so obtained are stirred at room temperature into 75 parts by volume of oleum containing 5% of free $SO_3$. After a short time, a neutralized sample is water-soluble. The solution is poured into 400 parts of ice. The precipitate is filtered, washed with a small amount of water and then dissolved in a dilute solution of sodium hydroxide. By salting out, the now water-soluble dyestuff can be obtained. It dyes cotton by the dyeing Process A, reddish-blue tints.

EXAMPLE 6

4.8 parts of 5:10-dianilino-3:8-dichloro-1:6-pyrenquinone are stirred for 24 hours under reflux, with 3.1 parts of thiosalicylic acid and 2.4 parts of potassium hydroxide in 125 parts of isopropanol. After cooling, the water-soluble vat dyestuff obtained dyes cotton by the dyeing Process A, yellowish-green tints.

By using 3.6 parts of mercaptobenzene-sulfonic acid instead of thiosalicylic acid, a water-soluble dyestuff is also obtained, and this dyes cotton green tints.

EXAMPLE 7

24 parts of 8:16-(or 3:11)-dichloro-acedianthrone, 11 parts of thiophenol and 6 parts of sodium carbonate are stirred for 24 hours under reflux, in 250 parts of amyl alcohol. After cooling, the dyestuff is isolated, well dried and then stirred in 10 times the quantity of oleum containing 5% of free $SO_3$, at room temperature. As soon as a neutralized sample is soluble in water, the whole is poured into ice, and the sulfonic acid obtained is washed neutral with a dilute solution of common salt. The residue is stirred into rather more than the calculated equivalent proportion of a normal solution of sodium hydroxide. By salting out, the dyestuff that probably has the formula

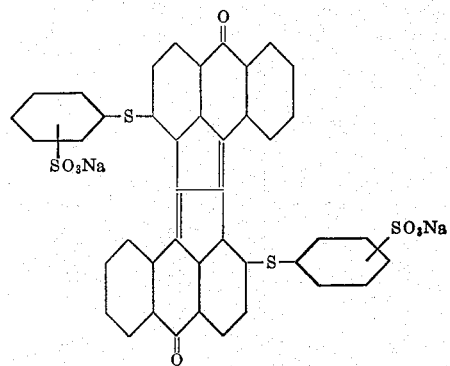

can be obtained. This dyes cotton by the dyeing Process A, brown tints.

EXAMPLE 8

10 parts of 6-phenylmercapto-anthraquinone-2:1(N)-benzacridone are added to 70 parts by volume of oleum containing 5% of free $SO_3$, with good stirring. As soon as a neutralized sample is soluble in water, the whole is treated in the usual manner. The dyestuff so obtained dyes cotton by the dyeing Process A, violet tints.

EXAMPLE 9

When in Example 4 instead of 10 parts of 3,3'-diphenyl-mercaptindanthrone, 10 parts of the polycyclic compounds shown in column I of the following table are subjected to the same sulfonation, water-soluble dyestuffs are obtained which dye cotton by the vat dyeing method the tints shown in column II.

| I | II |
|---|---|
| (structure) | Violet. |
| (structure) | Brown. |
| (structure) | Yellow. |
| (structure) | Brown. |

| I | II |
|---|---|
| 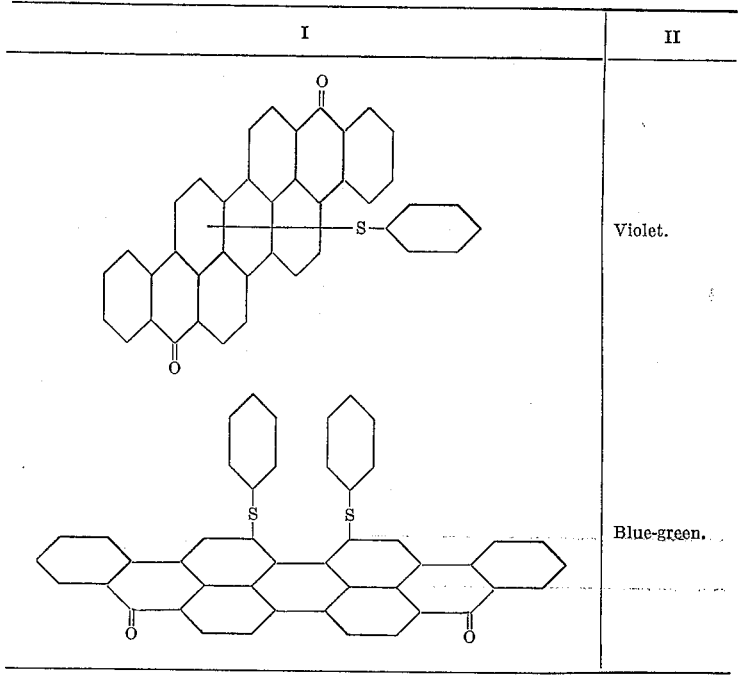 | Violet.<br><br><br><br><br><br><br><br>Blue-green. |

*Dyeing Prescription A*

0.15 part of the dyestuff is added to 50 parts of water and the whole is poured into a solution, having a temperature of 60° C., of 2 parts by volume of sodium hydroxide solution of 36° Bé. and 1.2 parts of hydrosulfite in 350 parts of water. 10 parts of cotton are dyed for 45 minutes in the dyebath so prepared in the presence of 12 parts of sodium chloride, the temperature being allowed to rise to 80° C. On completion of the dyeing operation, the cotton is rinsed in cold running water until oxidation is complete, whereupon it is acidified and soaped at the boil, rinsed with water and dried.

What is claimed is:

1. The product of the process comprising the reaction of a chromophore selected from the group consisting of 2,2′-bis-phenylmercapto-anthanthrone, 3,3′-bis-phenylmercaptoacedianthrone, 4-phenylmercaptopyranthrone, 3,12-bisphenylmercapto - dibenzanthrone, 4 - phenoxyanthanthrone-2,1 (N)-benzacridone, 6 - phenylmercaptoanthraquinone-2,1 (N)-benzacridone, and 4-phenylmercaptoindanthrene with about 7 to 10 parts oleum containing about 5% free $SO_3$ at room temperature, until a neutralized sample is water soluble.

2. The product of the process comprising the reaction of a member selected from the group consisting of
   (a) the product of the process comprising the reaction of 3,3′-dichloroindanthrene with thiophenol in the presence of potassium carbonate in amyl alcohol at reflux;
   (b) the product of the process comprising the reaction of 5,10-dianilino-3,8-dichloro-1,6-pyrenquinone with thiosalicylic acid and potassium hydroxide in isopropanol at reflux; and
   (c) the product of the process comprising the reaction of 8,16- or 3,11-dichloroacedianthrone with thiophenol and sodium carbonate in amyl alcohol at reflux, with about 7–10 parts oleum containing about 5% free $SO_3$ at room temperature until a neutralized sample is water soluble.

References Cited by the Examiner

UNITED STATES PATENTS

| 1,893,530 | 1/1933 | Anderson et al. | 260—355 |
| 1,932,591 | 10/1933 | Kranzlein et al. | 260—362 |
| 2,412,790 | 12/1946 | Allmen et al. | 260—373 X |
| 3,047,543 | 7/1962 | Morton | 260—79 |

FOREIGN PATENTS

| 708,122 | 7/1941 | Germany. |
| 120,716 | 11/1925 | Switzerland. |

OTHER REFERENCES

Venkataraman, "Synthetic Dyes," vol. II, p. 1018 (1952).

LORRAINE A. WEINBERGER, *Primary Examiner.*

R. K. JACKSON, H. C. WEGNER,

*Assistant Examiners.*